(12) United States Patent
Herbsleb et al.

(10) Patent No.: US 10,302,067 B2
(45) Date of Patent: May 28, 2019

(54) MODEL BASED CONTROLLER FOR A WIND TURBINE GENERATOR

(71) Applicant: VESTAS WIND SYSTEMS A/S, Aarhus N (DK)

(72) Inventors: Eik Herbsleb, Odder (DK); Fabiano Daher Adegas, Munich (DE); Poul Brandt Christensen, Ry (DK); Robert Bowyer, London (GB); Fabio Caponetti, Aarhus C (DK); Ian Couchman, Horley (GB); Lars Finn Sloth Larsen, Sydals (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 775 days.

(21) Appl. No.: 14/766,380

(22) PCT Filed: Feb. 4, 2014

(86) PCT No.: PCT/DK2014/050029
§ 371 (c)(1),
(2) Date: Aug. 6, 2015

(87) PCT Pub. No.: WO2014/121800
PCT Pub. Date: Aug. 14, 2014

(65) Prior Publication Data
US 2015/0369214 A1    Dec. 24, 2015

Related U.S. Application Data (60) Provisional application No. 61/763,487, filed on Feb. 12, 2013.

(30) Foreign Application Priority Data

Feb. 8, 2013 (DK) .................................. 2013 70067

(51) Int. Cl.
*F03D 7/04* (2006.01)
*F03D 7/02* (2006.01)

(52) U.S. Cl.
CPC ............. *F03D 7/045* (2013.01); *F03D 7/022* (2013.01); *F03D 7/0272* (2013.01); *F03D 7/046* (2013.01);
(Continued)

(58) Field of Classification Search
CPC ........ F03D 7/022; F03D 7/0272; F03D 7/045; F03D 7/046; F05B 2270/404; Y02E 10/723
(Continued)

(56) References Cited

FOREIGN PATENT DOCUMENTS

| DE | 102011079433 A1 | 1/2013 |
|---|---|---|
| EP | 2292928 A2 | 3/2011 |

(Continued)

OTHER PUBLICATIONS

Camblong, et al.: "Comparison of Three Wind Turbine Controller Synthesis Methodologies," Industrial Technology, 2006. ICIT 2006. IEEE International Conference on, vol., No., pp. 1908,1913, Dec. 15-17, 2006. URL: http :/ /ieeexplore. ieee.org/stamp/stamp. jsp?tp=&arnumber=4237738&isnumber=4237 511.
(Continued)

*Primary Examiner* — Mark A Laurenzi
*Assistant Examiner* — Paul Thiede
(74) *Attorney, Agent, or Firm* — Patterson + Sheridan, LLP (57) ABSTRACT

The invention relates to a controller configured to determine one or more future values of blade control references and/or a generator control references for a wind turbine generator. The first of the future values of the control references are used for control purposes. The future control references are determined from a physical model of a system of the wind
(Continued)

turbine generator by solving an optimization problem which includes at least one cost function and at least one constraint.

13 Claims, 4 Drawing Sheets

(52) U.S. Cl.
CPC ....... *F05B 2270/404* (2013.01); *Y02E 10/723* (2013.01)

(58) Field of Classification Search
USPC .............................................. 416/35; 290/44
See application file for complete search history.

(56) References Cited

FOREIGN PATENT DOCUMENTS

| | | |
|---|---|---|
| EP | 2541052 A1 | 1/2013 |
| WO | 2011/076295 A2 | 6/2011 |

OTHER PUBLICATIONS

Muhando, et al.: "Full State Feedback Digital Control of WECS With State Estimation by Stochastic Modeling Design," Power and Energy Society General Meeting—Conversion and Delivery of Electrical Energy in the 21st Century, 2008 IEEE, vol., No., pp. 1,8, Jul. 20-24, 2008. URL: http ://ieeexplore. ieee.org/stamp/stamp.jsp?tp=&arnumber=4596132&isnumber=4595968.
Soliman M, et al.: "Multiple Model Multiple-Input Multiple-Output Predictive Control for Variable Speed Variable Pitch Wind Energy Conversion Systems", IET Renewable Power Generation, vol. 5, No. 2, Mar. 9, 2011, pp. 124-136.
Soliman M, et al.: "Multiple Model Predictive Control for Wind Turbines With Doubly Fed Induction Generators", IEEE Transactions on Sustainable Energy, IEEE, USA, vol. 2, No. 3, Jul. 1, 2011.
Haiyang Zheng, et al.: "Anticipatory Control of Wind Turbines With Data-Driven Predictive Models", IEEE Transactions on Energy Conversion, IEEE Service Center, Piscataway, NJ, US, vol. 24, No. 3, Sep. 1, 2009, pp. 766-774.
Henriksen, L C, et al.: "Wind Turbine Control With Constraint Handling: a Model Predictive Control Approach", IET Control Theory and Applications, The Institution of Engineering and Technology, GB, vol. 6, No. 11, Jul. 19, 2012, pp. 1722-1734.
International Search Report for PCT/DK2014/050029, dated Apr. 4, 2014.
Danish Search Report for PA 2013 70067, dated Sep. 6, 2013.

MODEL BASED CONTROLLER FOR A WIND TURBINE GENERATOR

FIELD OF THE INVENTION

The invention relates to wind turbine generators and in particular to controllers for wind turbine generators.

BACKGROUND OF THE INVENTION

Wind turbine generators may be operated in partial and full load modes. In partial load modes the objective is to optimise power production from a given available amount of wind energy. In full load modes the objective is to produce the nominal power of the wind turbine generator.

It is known to use different control schemes in order to control the wind turbine generator in the different load modes. Accordingly, switching between the different control schemes is required as the wind velocity varies between low wind velocities where the wind turbine generator should be operated in the partial load mode and high wind velocities where the wind turbine generator should be operated in the full load mode. Such switching may have undesirable effects on structural loads, utilisation of the wind energy and other operating conditions of the wind turbine generator.

Thus, it is a problem that known control schemes may have difficulties in dealing with switching between different control schemes.

WO2011/076295 discloses a wind turbine having a control method and controller for performing predictive control of a wind turbine generator. Based on the measured instantaneous wind speed, it is known to provide control signals to a wind turbine in order to control the pitch of the wind turbine rotor blades and the speed of the generator. However, it is difficult using instantaneous wind speed measurements to achieve smooth control, due to finite response speeds of the associated electro-mechanical systems, as well as the constantly changing control system inputs. The predictive control system described in the application assumes a model of generator speed based on the values of the incident wind speed v(t) and the values of a control signal u(t) output to the wind turbine in a feed forward loop. Here, the control signal can be for one or more of controlling either the power setting of the generator, or the pitch angle of the rotor blades. The predictive controller uses a rolling time series of values for v(t) and u(t) and based on a predicted response of the generator speed w(t) optimises the time series control signal u(t). The predicted response of the generator speed w(t) is based on model, that can be refined in real time as the wind turbine operates.

The inventor of the present invention has appreciated that improvement in wind turbine controllers is of benefit, and has in consequence devised the present invention.

SUMMARY OF THE INVENTION

It would be advantageous to achieve improvements in controllers for wind turbine generators. In general, the invention preferably seeks to alleviate or eliminate one or more of the above mentioned disadvantages of know controllers singly or in any combination. In particular, it may be seen as an object of the present invention to provide a method that solves the above mentioned problems relating to switching between partial and full load modes, or other problems, of the prior art.

To better address one or more of these concerns, in a first aspect of the invention a controller for determining control input references including a blade control reference and/or a generator control reference for a wind turbine generator is presented, wherein the blade control reference is for controlling aerodynamic properties of a blade of the wind turbine generator and wherein the generator control reference is for controlling a generator parameter (e.g. generator torque generator power, or generator speed), the controller includes a dynamic model that includes states representative of operation of the wind turbine and the control input references, wherein the model provides future values of the states, and wherein the dynamic model formulates a coupled dependency of the blade control reference and the generator control reference on the states, a constraint defining a limit of a future operational parameter of the wind turbine, a cost function depending on the future values of the states, wherein the cost function is defined so as to provide a numerical cost value relating to operation of the wind turbine, and a solver for determining the blade control reference and/or the generator control reference, wherein the solver is configured so that the blade control reference and/or the generator control reference are determined so that the set of constraints are satisfied and so that the numerical cost value is optimised.

Since the dynamic model formulates a coupled dependency of the blade control reference and the generator control reference on the states the controller may be capable of determining both the future blade control references and the future generator control references in dependence of each other. This dependency may enable a smooth transition between full and partial load states/modes since the blade control reference and the generator control reference may smoothly be varied during a transition.

Whereas the controller may be capable of determining both future blade control references and future generator control references in dependence of each other, the controller may also be configured so that only the blade control reference or the generator control reference is determined.

In an embodiment the cost function includes a term that relates to the power production of the turbine. The power term or terms in the cost function may be used to optimise the power production.

In an embodiment the cost function includes a term that relates to fatigue load of the wind turbine generator. The fatigue term or terms in the cost function may be used to minimise structural loading of the components of the wind turbine generator.

In an embodiment the cost function includes a term that relates to fatigue load of the wind turbine generator and a term that relates to the power production of the turbine. The combination of fatigue and power terms in the cost function may be used to provide a trade-off between power production and fatigue load in the determination of future blade and/or generator control references.

In an embodiment the future operational parameter of the wind turbine generator depends on the future states, i.e. the future operational parameter of the wind turbine generator may be determined from estimated the future states $x(k+1)$.

In an embodiment the numerical cost value of the cost function depends on a difference between the future operational parameter and a soft constraint defining a soft limit of the future operational parameter. The soft constraint in the cost function may allow a parameter to exceed the soft limit value, in contrast to hard constraints.

In a related embodiment the soft limit of the future operational parameter is a limit on rotor speed enabling the rotor speed to be higher than a nominal rotor speed for a given period of time. Examples of soft limits other than the rotor speed includes power production, pitch speed and harmonic variation of pitch and torque within frequencies that trigger tower or rotor resonance vibrations.

In an embodiment the solver is configured for determining the blade and generator references for controlling both the aerodynamic properties and generator power or the generator parameter.

In an embodiment the solver is configured to determine the blade and generator references during operation of the wind turbine generator.

As second aspect of the invention relates to a wind turbine generator comprising a controller according to the first aspect.

A third aspect of the invention relates to a method for determining control input references including a blade control reference and/or a generator control reference for a wind turbine generator, wherein the blade control reference is for controlling aerodynamic properties of a blade of the wind turbine generator and wherein the generator control reference is for controlling a generator parameter, the method includes providing a controller that includes:
  a dynamic model that includes states representative of operation of the wind turbine and the control input references, wherein the model provides future values of the states, and wherein the dynamic model formulates a coupled dependency of the blade control reference and the generator control reference on the states,
  a constraint defining a limit of a future operational parameter of the wind turbine, and
  a cost function depending on the future values of the states, wherein the cost function is defined so as to provide a numerical cost value relating to operation of the wind turbine, wherein the method further comprises determining the blade control reference and/or the generator control reference by determining future values of the states from the model so that the set of constraints are satisfied and so that the numerical cost value is optimised.

In general the various aspects of the invention may be combined and coupled in any way possible within the scope of the invention. These and other aspects, features and/or advantages of the invention will be apparent from and elucidated with reference to the embodiments described hereinafter.

In summary the invention relates to a controller configured to determine one or more future values of blade control references and/or a generator control references for a wind turbine generator. The first of the future values of the control references are used for control purposes. The future control references are determined from a physical model of a system of the wind turbine generator by solving an optimization problem which includes at least one cost function and at least one constraint.

BRIEF DESCRIPTION OF THE DRAWINGS

Embodiments of the invention will be described, by way of example only, with reference to the drawings, in which.

DETAILED DESCRIPTION OF AN EMBODIMENT

Figure 1:
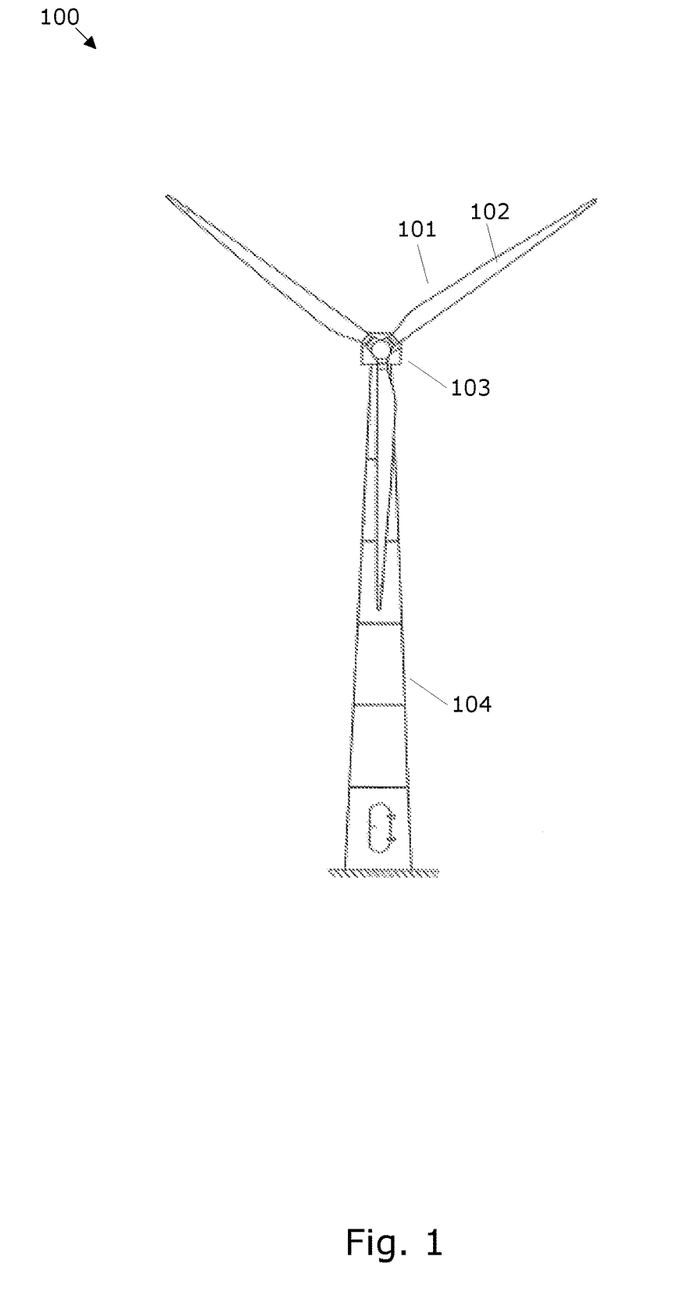
FIG. 1 shows a wind turbine generator 100.

FIG. 1 shows a wind turbine generator 100, hereafter also referred to as a WTG. The WTG 100 comprises a rotor 101 for driving a shaft coupled to a power generator for generation of electric power from the wind driven rotor 101. A gearbox may connect a shaft of the rotor 101 to a shaft of the generator. Output power from the generator may be converted by a power converter, e.g. in frequency, before being supplied to a utility grid. The generator torque by which the generator loads the rotor may be controlled by supplying a power reference or a torque reference to the power converter. The pitch angle $\beta$ of blades 102 of the rotor 101 may be controllable to adjust the aero-dynamic efficiency of the blades. The gear box, the generator and/or the power converter may be located in a nacelle 103. The nacelle 103 and rotor 101 is located on top of a tower 104. The WTG further comprises a control system 300 according to an embodiment of the invention for controlling the generator torque and/or the pitch.

Figure 2:
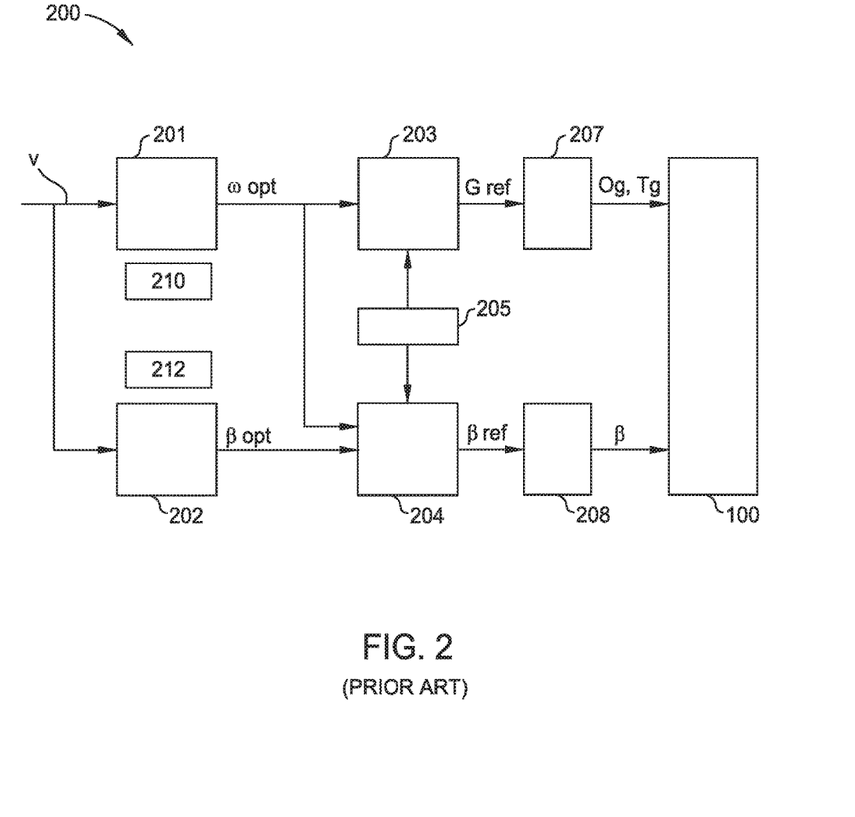
FIG. 2 shows a known control system 200.

FIG. 2 shows a known control system 200 comprising a partial load controller 203 and a full load controller 204 for controlling the WTG 100 in respective partial load and full load states.

The partial load controller 203 receives as an input an optimal rotor speed $\omega$_opt and generates a generator reference G_ref which may be a generator power or generator torque control reference (P_ref or Q_ref) for the power converter of the WTG 100. The generator reference G_ref is supplied to a power controller 207 which generates a torque or power control signal (Qq or Pg) to the generator or generator converter of the WTG 100.

The full load controller 204 receives as an input an optimal pitch angle $\beta$_opt and generates a pitch reference $\beta$_ref for the pitch actuators of the WTG 100. The pitch reference $\beta$_ref may include individual pitch reference values for one or more pitch actuators of the WTG. The pitch reference $\beta$_ref is supplied to a pitch controller 208 which generates one or more pitch signals $\beta$ for the one or more pitch actuators.

The partial load state is characterised in that the wind speed v is not high enough to enable generation of the nominal electrical power from the generator (i.e. substantially full power production). In this state the pitch $\beta$ and rotor speed $\omega$r are controlled to optimize aerodynamic efficiency of the WTG. In practice the pitch $\beta$ only varies little in the partial load state as a function of wind speed and generator speed and, therefore, may be determined by a given function or a look-up table. The rotor speed $\omega$r may be controlled to extract as much power as possible by tracking the optimal rotor speed $\omega$_opt. In the partial load state the rotor speed $\omega$r may be controlled via the generator torque Qg affected by the generator on the rotor. The generator torque Qg can be controlled by setting a torque or power production control signal (Qg or Pg) to the power converter. The torque or power production references (Q_ref or P_ref)—associated with the torque or power production control signal (Tg or Qg)—are commonly referred to as a generator reference G_ref for convenience.

The full load state is characterised in that the wind speed v is high enough to enable generation of the nominal electrical power. Therefore, the generator speed and generator power may be controlled to achieve a power production close to the nominal power. This may be achieved by controlling the pitch β so as to achieve a controlled, e.g. substantially constant, extraction of wind energy by the blades. Accordingly, the desired generation of power may be controlled by tracking the optimal pitch β.

The optimal rotor speed ω opt is determined by an opti-speed calculator 201 in dependence of the estimated or measured wind speed energy content of the wind v and predetermined aerodynamic characteristics of the blades. The optimal pitch β_opt is determined by an opti-pitch component 202 in dependence of the estimated or measured wind speed energy content of the wind v and other predetermined aerodynamic characteristics of the blades.

Either the partial load controller 203 or the full load controller 204 generates a control reference in the form of a pitch reference β_ref or a generator reference G_ref for the WTG 100. A shift between the partial load control and full load control may be invoked when the energy content of the wind, e.g. the wind velocity, passes a given threshold. The switch 205 determines which of the partial load controller 203 or the full load controller 204 should be active in dependence of an estimated or measured energy content of the wind.

The switching between the partial and full load controllers may cause undesirable or non-smooth changes in different operating parameters of the WTG. For example, a switching between partial and full load states may cause over-speed of the rotor, undesirable tower loads, undesirable blade loads and high pitch system requirements due to high pitch speed.

Figure 3:
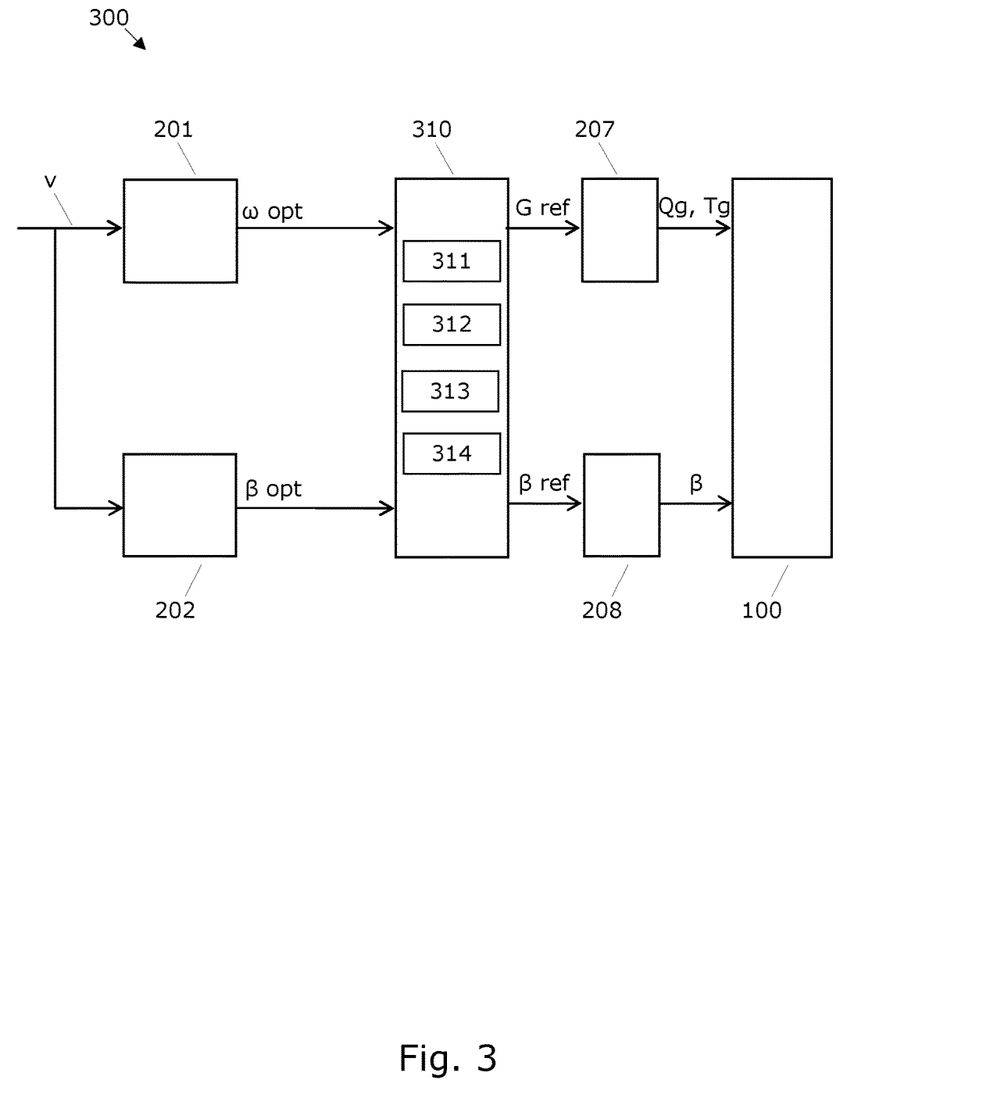
FIG. 3 shows a control system 300 with a controller 310 configured as a model prediction controller.

FIG. 3 shows a control system 300 with a controller 310 for determining control input references including a pitch control reference β_ref and a generator reference G_ref (i.e. a power, a torque or a rotation speed control reference, (P_ref, Q_ref, Uref, respectively) for a wind turbine generator 100. Thus, the control system 300 is equivalent to the control system 200, at least in some aspects, but differs from the control system by the controller 310 for determining the control input references β_ref, G_ref.

Either the power, the torque or the rotation speed generator reference may be used for controlling the generator torque, i.e. for controlling the torque load on the rotor of the wind turbine generator and, thereby, the rotation speed of the rotor.

Blades of a wind turbine may be configured with other aerodynamic adjustments than the pitch β. For example, the blades may be configured with flaps or aerodynamic brakes capable of changing the aero dynamic properties of the blades. Thus, in general the controller 310 may be configured for determining control input references including blade control references, where blade control references may include one or more of: pitch control references β_ref, flap control reference, aerodynamic brake references and other references for affecting aerodynamic properties of the blades, i.e. aerodynamic properties such as aerodynamic lift. The examples herein focus on pitch control references β_ref.

The controller 310 is a model predictive controller which includes a dynamic model or physical model 311 of one or more systems of the WTG, one or more cost functions 312 defining one or more numerical cost values of operation of the WTG, one or more constraints 313 defining operational limits of the WTG, and a solver 314 for determining the pitch and generator references β_ref, G_ref in a way so that the constraints are satisfied and so that the numerical cost value is optimised with respect to a desired value of operation of the WTG. The controller 310 is described in more detail hereafter.

In an example, the model is determined from eq. 1:

$$\frac{d\omega_g}{dt} = N\frac{Q_r - NQ_g}{I_r}$$

which describes the relation between generator speed ωg, rotor torque Qr, generator torque Qg, rotor inertia Ir and gear ratio N, and from eq. 2:

$$Q_r = \frac{\frac{1}{2}A_r\rho V^3 C_p(\beta, \lambda)}{\omega_r}$$

which describes the rotor torque Qr caused by aerodynamic properties of the blades being described by Cp which is a blade dependent value describe the aero-dynamical efficiency as a function of the pitch angle β and the tip-speed-ratio λ=Rωr/V. Ar is the rotor area, p is the air density, V is the wind speed, ωr is rotor speed and R is rotor radius.

Linearizing eq. 2 around a stationary operating point (β, ωr) for a given wind speed and assuming that the wind speed is constant over a prediction horizon, eq. 3 is obtained:

$$Q_{r,lin}(V) = Q_{r,0}(V) + \frac{dQ_r(V)}{d\beta}\Delta\beta + \frac{dQ_r(V)}{d\omega_r}\frac{1}{N}\Delta\omega_g$$

where Δωg and Δβ are increments in the linearization in generator speed and the pitch, respectively, relative to operating point (β_o, ωr_o), and Qr,0(V) is rotor torque at the operating point (β, ωr). Inserting eq. 3 in eq. 1 gives eq. 4

$$\frac{d\Delta\omega_g}{dt}\frac{I_r}{N} = -N\Delta Q_g + \frac{dQ_r}{d\beta}\Delta\beta + \frac{dQ_r}{d\omega_r}\frac{1}{N}\Delta\omega_g$$

Eq. 4 describes a physical model of the rotor and generator dynamics, wherein ωg is the generator speed, ωr is the rotor speed, Ir is the rotor inertia, N is the gear exchange so that ωg=Nωr, Qg is the generator torque, ΔQg is an increment of the generator torque, Qr is the rotor torque and β is the pitch angle.

By using:

$$Q_{g,0} + \Delta Q_g = Q_g \text{ and } Q_{r,0} - NQ_{g,0} = 0$$

Eq. 4 can be rewritten as eq. 5:

$$\Delta\dot{\omega}_g = \frac{dQ_r}{d\omega_r}\frac{1}{I_r}\Delta\omega_g + \left[\frac{N}{I_r}\frac{dQ_r}{d\beta} \quad -\frac{N^2}{I_r}\right]\begin{bmatrix}\Delta\beta \\ \Delta Q_g\end{bmatrix}$$

By discretizing using e.g. Euler or a zero order hold method eq. 2 can be written as a state equation, eq. 6:

$$x(k+1) = Ax(k) + Bu(k)$$

$$y(k+1) = Cx(k) + Du(k)$$

where x(k)=(Δωg) is a state of the equation, y(k)=Δωg is the output, u(k)=[Δβ(k), ΔQg(k)] in an input to the model, and k denotes the time instant.

Eq. 4 shows that the state ($\Delta\omega g$) and the output $\Delta\omega g$ depends on both the pitch $\beta$ and the generator torque Qg. Accordingly, the dynamic model in equations 1-3 formulates a coupled dependency of the pitch control reference $\beta\_ref$ and the generator control reference $G\_ref$ on the states x. The coupled dependency of the pitch control reference $\beta\_ref$ and the generator control reference $G\_ref$ enables simultaneously control of both the pitch $\beta$ and generator torque Qg.

In general the dynamic model used in the controller is a physical model of a real system of the WTG where the model includes states x representative of operation of the wind turbine and control references u as input to the model and where the model enables determination of future values of the states x and the output y, i.e. values of states at time k+1 or later.

In another example, the model is determined from eq. 1a:

$$\frac{d^2 y}{dt^2} + 4\pi D_y f_{towy} \frac{dy}{dt} + 4(\pi f_{towy})^2 y = \frac{F_T}{M_{top} + M_{tow}}$$

where y is thrustwise displacement of the tower, Mtop and Mtow are masses, FT is thrust force, ftowy is eigen frequency of the tower, Dy is a damping coefficient and k is tower stiffness, and from eq. 2a:

$$F_T = \tfrac{1}{2} A_r \rho V^2 C_T(\beta, \lambda)$$

where CT is a coefficient describing the aero-dynamical efficiency as a function of the pitch angle $\beta$ and tip-speed-ratio $\lambda$. Other variables are described above.

Linearizing eq. 2a around a stationary operating point ($\beta$, $\omega r$) for a given wind speed and assuming that the wind speed is constant over a prediction horizon, eq. 3a is obtained:

$$F_{T,lin}(V) = F_{T,0}(V) + \frac{dF_T(V)}{d\beta} \Delta\beta + \frac{dF_T(V)}{d\omega_r} \frac{1}{N} \Delta\omega_g$$

where $\Delta\omega g$ and $\Delta\beta$ are increments in generator speed and the pitch, respectively, relative to the operating point ($\beta\_o$, $\omega r\_o$), and Ft,0(V) is trust force at the operating point ($\beta$, $\omega r$). Inserting eq. 3a in eq. 1a gives eq. 4a:

$$\frac{d^2 y}{dt^2} + 4\pi D_y f_{towy} \frac{dy}{dt} + 4(\pi f_{towy})^2 y = \frac{\frac{dF_T(V)}{d\beta} \Delta\beta + \frac{dF_T(V)}{d\omega_r} \frac{1}{N} \Delta\omega_g + F_{T,0}}{M_{top} + M_{tow}}$$

Eq. 4a describes a physical model of tower displacement in terms of wind speed and other operational parameters of the WTG.

By using:

$$y_0 + \Delta y = y \text{ and}$$

$$4(\pi f_{towy})^2 y_0 - \frac{F_{T,0}(V)}{M_{top} + M_{tow}} = 0$$

Eq. 4a can be rewritten as eq. 5a:

$$\begin{bmatrix} \frac{d\Delta \dot{y}}{dt} \\ \Delta y \end{bmatrix} = \begin{bmatrix} -4\pi D_y f_{towy} & -4(\pi f_{towy})^2 \\ 1 & 0 \end{bmatrix} \begin{bmatrix} \frac{d\Delta y}{dt} \\ \Delta y \end{bmatrix} +$$

$$\begin{bmatrix} \frac{dF_T(V)}{d\beta} \\ M_{top} + M_{tow} \\ 0 \end{bmatrix} \Delta\beta + \begin{bmatrix} \frac{dF_T(V)}{d\omega_r} \frac{1}{N} \\ M_{top} + M_{tow} \\ 0 \end{bmatrix} \Delta\omega_g$$

Combining eq. 5a with eq. 4 results in a model 311 wherein the state update x is given by eq. 7:

$$\begin{bmatrix} \Delta\dot\omega_g \\ \frac{d\Delta y}{dt} \\ \Delta y \end{bmatrix} = \begin{bmatrix} \frac{dQ_r}{d\omega_r} \frac{1}{I_r} & 0 & 0 \\ \frac{dF_T(V)}{d\omega_r} \frac{1}{N} & -4\pi D_y f_{towy} & -4(\pi f_{towy})^2 \\ M_{top} + M_{tow} & & \\ 0 & 1 & 0 \end{bmatrix} \begin{bmatrix} \Delta\omega_g \\ \frac{d\Delta y}{dt} \\ \Delta y \end{bmatrix} +$$

$$\begin{bmatrix} \frac{N}{I_r} \frac{dQ_r}{d\beta} & -\frac{N^2}{I_r} \\ \frac{dF_T(V)}{d\beta} & 0 \\ M_{top} + M_{tow} & \\ 0 & 0 \end{bmatrix} \begin{bmatrix} \Delta\beta \\ \Delta Q_g \end{bmatrix}$$

and wherein the output $\Delta y$ is given by eq. 8:

$$\begin{bmatrix} \Delta\omega_g \\ \Delta y \end{bmatrix} = \begin{bmatrix} 1 & 0 & 0 \\ 0 & 0 & 1 \end{bmatrix} \begin{bmatrix} \Delta\omega_g \\ \frac{d\Delta y}{dt} \\ \Delta y \end{bmatrix} + \begin{bmatrix} 0 & 0 \\ 0 & 0 \end{bmatrix} \begin{bmatrix} \Delta\beta \\ \Delta Q_g \end{bmatrix}$$

Again the model given by eq. 7 and eq. 8 can be discritized and thereafter written in the standard form as eq. 9:

$$x(k+1) = Ax(k) + Bu(k)$$

$$y(k+1) = Cx(k) + Du(k)$$

where $x(k) = (\Delta\omega g, \Delta y, \Delta y)$ is a state of the equation, $y(k) = (\Delta\omega g, \Delta y)$ is the output, $u(k) = [\Delta\beta(k), \Delta Qg(k)]$ in an input to the model, and k denotes the discrete time instant obtained by discretizing. The variation $\Delta\beta(k)$ is related to the reference $\beta\_ref$ by $\beta\_ref(k) = \beta\_o + \Delta\beta(k)$ and $\Delta Qg(k)$ is similarly related to the reference $Qg\_ref$ by a stationary operating point $Qg\_o$.

The model need not be a linearized model, but also non-linear models may be utilized for the controller.

The purpose of the one or more cost functions 312 is to find solutions to the model 311 which minimizes the cost defined in the cost functions. In general a cost function may be written as eq. 10:

$$\sum_{i=0}^{T} x(k+i)^T Q x(k+i) + \Delta u(k+i)^T R_{\Delta u} \Delta u(k+i)$$

in terms of future states x(k+1) and/or deviations of future control input u(k+1) from e.g. the optimal generator torque Qg_opt and/or the optimal pitch $\beta\_opt$ so that states and input increments are penalized in the cost function. In general, future states and other future parameters such as the future control input variables may include values at discrete time instants k+1, k+2, ... k+i, ... k+N. The state vector x may include one or more of tower velocity dy/dt, tower displacement y, generator speed ωg, integral of generator speed and pitch values β. The control input u may include deviations of the pitch control reference β_ref, of the generator reference G_ref (torque reference Qg_ref or power reference Pg_ref for the generator) or deviations of other reference values from their optimal values determined from predetermined reference values.

Other norms than the 2-norm in eq. 10 may be used to define the cost function. For example, the 1-norm (absolute value) or an infinite norm (the highest error over the time horizon) may be used.

Thus, the cost function is defined so as to provide a numerical cost value relating to operation of the wind turbine. For example, the tower displacement Δy may be defined in the cost function so as to provide a cost relating to the fatigue load of the tower, and deviations of the pitch control reference β_ref from the optimal pitch β_opt may be defined so as to provide a cost relating to reductions of power production.

Other examples of load related costs in the cost function includes fatigue life of different WTG components, blade fatigue life and bearing life of blade or main bearings.

Accordingly, the cost function may include one or more terms relating to the power production of the turbine and/or one or more terms relating to fatigue load of the wind turbine generator. By defining both a power production cost and a fatigue load cost the cost function may be defined so as to provide a trade-off between the power production and the fatigue load.

Eq. 11 below is an example of a cost function:

$$\min_{\Delta\beta, Q_g} \sum_{k=1}^{H} (\|\Delta\beta(k)\|C_\beta + \|\Delta\omega_g(k)\|C_\omega)$$

where Δβ=β_opt−β_ref(k), Δωg=ωg_opt−ωg(k), k=1 is the first prediction time, H is the prediction horizon, C_β and C_ω are costs associated with deviation from the respective optimal pitch values β_opt and optimal generator speed values ω_opt and $\|\cdot\|$ denotes a norm. Since β_opt and ω_opt maximizes the power production, solving the model 311 for pitch references β_ref and generator references G_ref while minimizing eq. 11 will result in values of β_ref and G_ref which maximizes power production. Accordingly, the terms in the eq. 11 relate to power production. Since the predicted values of β_ref and ωg in eq. 11 depends on future/predicted states x (as can be seen from the model 311), e.g. 11 also depends on future states x.

Eq. 12 below is another example of a cost function:

$$\min_{\Delta\beta, Q_g} \sum_{k=1}^{H} (\|\Delta\beta(k)\|C_\beta + \|\Delta\omega_g(k)\|C_\omega + \|\Delta y(k)\|C_y)$$

where Δy=y_0−y(k) and Cy is a cost associated with tower load. y_steady is the steady state position of the tower. Thus, the Σ∥Δy∥ term describes the summed tower deviations from the steady state position and, therefore, represents the tower fatigue load. Since the cost function in eq. 12 includes terms relating to the cost of power production and fatigue load, the cost function provides a trade-off between power production and fatigue load.

The one or more constraints 313 may include hard constraints and/or soft constraints. The purpose of the hard constraints is to ensure that certain operational parameters of the WTG, e.g. pitch, generator torque, rotor speed and/or tower displacement, does not exceed corresponding operational limits.

The purpose of the soft constraints is to allow certain operational parameters of the WTG, e.g. pitch, generator torque, rotor speed and/or tower displacement, to exceed corresponding operational limits in a controlled way.

Thus, use of constraints offers the possibility of operating the WTG close to predetermined limits which may have been determined by structural design loads such as extreme tower displacement, blade bending moment, main bearing tilt and yaw, maximum torsion on the main shaft and other structural design limits. Other examples, of constraints include limits determined by actuator constraints, e.g. pitch constraints.

In an embodiment of the invention the constraints are exploited by the controller 300 to enable a smooth transition between operating states, e.g. between partial load states 315 and full load states 316, without requiring logical conditions for switching as required in the known controller 200. For example, a constraint on maximum generator torque or maximum generator power may ensure a smooth transition from a partial load state 315 to a full load state 316 where the pitch is adjusted to generate less power during the state transition due the power constraint. That is, since there is a limit on power production, future values of parameters which affect the power production such as the pitch will be adapted to satisfy and the constraints and possibly also the cost function.

Examples of constraints are described below.

In order to avoid overloading of the gear box a limit on the maximum generator torque Qg max may be defined as a constraint:

$$Q_g \leq Q_{g,max}$$

so that only a maximum torque Qg,max is allowed to be transmitted to the generator.

A limit ωg,max on the generator speed ωg may be defined by the constraint:

$$\omega_g \leq \omega_{g,max}$$

Another limit FT,max limit on the thrust force FT may be defined by the constraint:

$$F_T \leq F_{T,max}$$

Other constraints include pitch rate which may be used for minimising actuator loads and to ensure that the calculated future pitch rates do not exceed the physical limits of the actuators. Still other constraints include a constraint G_ref>0 to avoid gear talk reversals, a constraint P_ref>T to avoid generation of power above a threshold, and a constraint y<y_max to avoid tower displacements above a given threshold y_max.

The operational parameters Qg, ωg and FT or other parameters in the constraints are future values at times greater than k, e.g. at time k+1. The future values of the operational parameters of the constraints may be determined from the model 311 or from other models. The operational parameters in the constraints may depend on the futures states x(k).

Alternatively or additionally, soft constraints may be utilised in the controller.

An example on a soft constraint on generator speed ωg is defined in a cost function given below $$\min_{\Delta\beta, Q_g, \varepsilon} \sum_{k=1}^{H} (\|\Delta\beta(k)\|C_\beta + \|\Delta\omega_g(k)\|C_\omega + \|\varepsilon\|C_\varepsilon)$$

$$\omega_g - \omega_{g,max} \leq \varepsilon$$

which is similar to eq. 12 except for the last term wherein ε has the function of the soft constraint. As long as ωg<=ωg_max then the optimal value of ε is zero, and hence does not contribute to the cost in that situation. In cases where ωg>ωg_max then the optimal value of ε is ωg−ωgmax, hence introducing a cost that can only be minimized by bringing ωg<ωg_max again.

Accordingly, in order to obtain a soft constraint, the numerical cost value of the cost function may depend on a difference between the future operational parameter (ωg or other parameter) and a soft constraint defining a soft limit (ωg_max or other operational limit) of the future operational parameter.

The solver 314 is configured to determine the pitch and generator references (β_ref, G_ref) by iteratively solving the model 311 to find future states x and future output y, solving the cost function 312 using future states x and/or future output y, updating the input u to the model so that the constraint 313 is satisfied and so that the numerical cost value is optimised.

Thus, the solver 314 is configured to solve an optimization problem defined by the model 311, the constraint 313 and the cost function 312 over the H step time horizon which results in the optimal control values (β_ref, G_ref) for a H time steps.

In an example, the optimization problem can be formulated as follows:

$$\min_{\Delta\beta, Q_g} \sum_{k=1}^{H} (\|\Delta\beta(k)\|C_\beta + \|\Delta\omega_g(k)\|C_\omega)$$

Subject to:

$Q_g(k) \leq Q_{g,max}$ for all $k$ $\omega_g(k) \leq \omega_{g,max}$ for all $k$ $x(k+1) = Ax(k) + Bu(k)$ $y(k+1) = Cx(k) + Du(k)$ for all $k$ wherein the cost function is minimized subject to the constraints and based on the states x(k+1) and output values y(k+1) of the model.

The model 311, the constraint 312 and the cost function 313 may be processed as an optimization problem using e.g. a steepest decent method, Newton's method, Interior point methods, and simplex methods in order to determine the pitch and generator references β_ref, G_ref.

The solver may be configured for determining the pitch and generator references for controlling both pitch and generator torque simultaneously so that both references may be used simultaneously for controlling both the pitch and the generator torque.

During processing of the model 311, the constraint 312 and the cost function 313, the states representative of operation of the wind turbine x(k) may be determined as estimated or measured values. For example, measured states x(k) may include wind speed v or rotor speed ωr, tower acceleration, pitch and/or generator power. An example of an estimated state x(k) may be the tower displacement y. The wind speed v may also be considered as a measured or estimated disturbance.

Thus, the controller 310 may further include sensors or estimating functions for measuring or predicting states x(k) and other operational parameters relating to the operation of the wind turbine generator.

The solver 314 is configured to determine the pitch and generator references β_ref, G_ref during operation of the wind turbine generator so the operation of the WTG may be continuously optimised in dependence of varying conditions.

Figure 4:
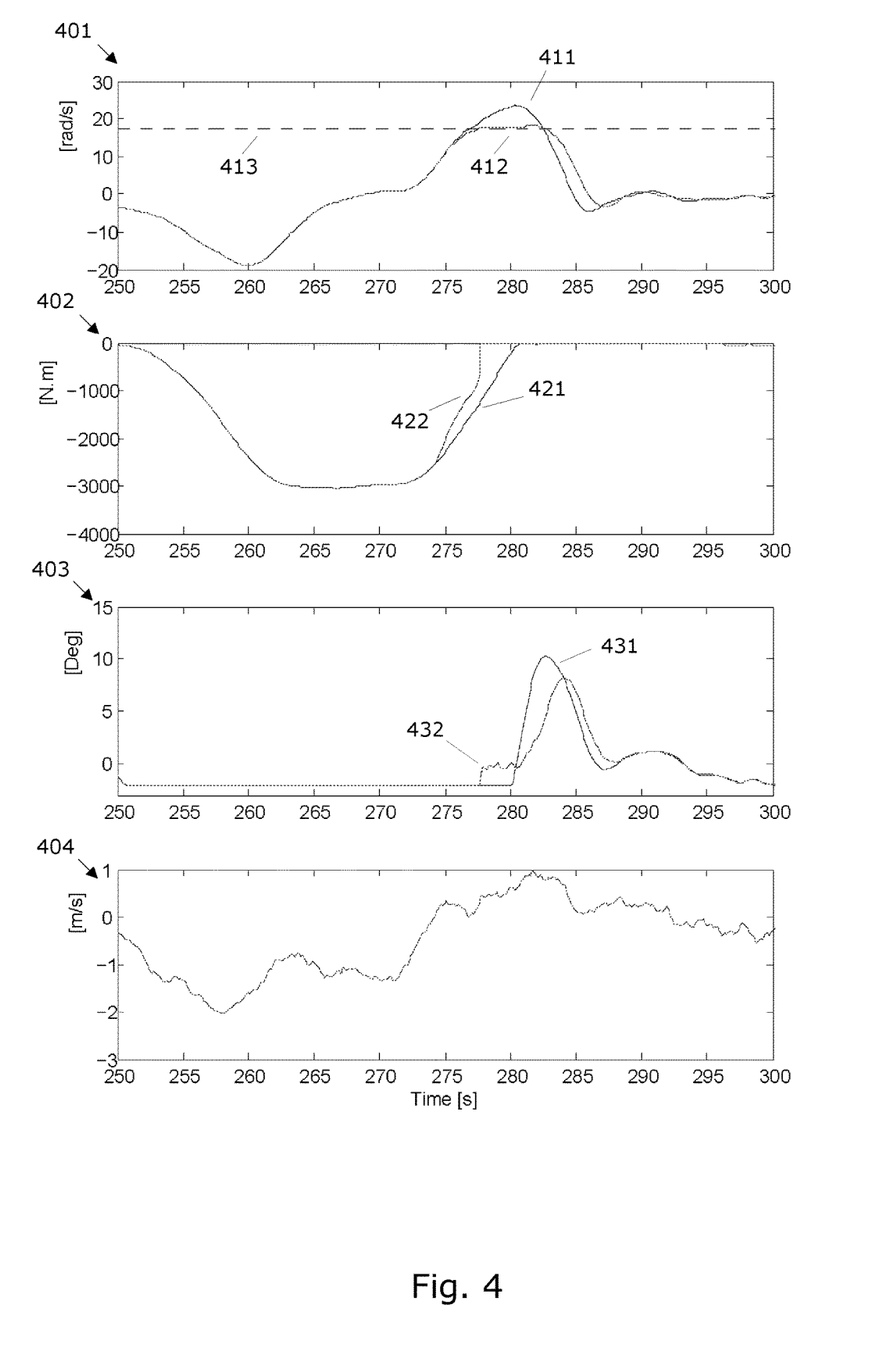
FIG. 4 shows simulation results for comparison of a known control system corresponding to the control system 200 with a control system corresponding to the control system 300.

FIG. 4 shows the simulation of generator speed ωg in graph 401, generator torque Qg in graph 402, pitch β in graph 403. Graf 404 shows wind speed data used for the simulation, where the wind speed data shows variations in wind speed from a nominal wind speed of 13 m/s. Curves 412, 422, 432, shows results from shows a control system 300 with a model predictive controller 310 configured with a constraint ωg max on generator speed. The constraint ωg max is illustrated as the horizontal line 413. Curves 411, 421, 431 show results from a control system corresponding to the control system 200.

Due to an increasing wind speed after 270 seconds, the MPC controller 310 is able to predict that the generator speed will exceed the limit ωg_max, 413 in the future. However, since the solutions to the model 311 has to satisfy the constraint, the pitch and generator references β_ref, G_ref (here Q_ref) are determined from the model to prevent the generator speed from exceeding the limit ωg_max. From the curve 422 of the generator torque reference G_ref it is seen that the torque reference increases more rapidly as compared to the curve 421 of the generator torque reference for the other controller 200. The additional increase in generator torque helps to prevent the generator speed from exceeding the limit ωg_max. From curve 432 of the pitch reference β_ref it is also seen that the pitch reference starts to increase before the pitch reference of the other controller 200. The increase in the pitch reference reduces the aerodynamic efficiency. Thereby, the earlier increase in the pitch reference also helps to prevent the generator speed from exceeding the limit ωg_max.

The time before the generator torque Qg reaches zero (i.e. the nominal power) corresponds to the partial load state, whereas the time after that the generator torque Qr has reached zero corresponds to the full load state. Due the use of a constraint on generator speed in combination with the capability of the model 311 to predict future states, e.g. generator speed, a smooth transition between the partial and full load states is achieved.

Furthermore, since both a pitch reference and a generator reference is determined simultaneously both the pitch β and generator torque Qg can be controlled simultaneously, e.g. during a transition from the partial load state to the full load state in FIG. 4.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "including" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A controller for a wind turbine generator that controls a value for a blade control reference and a value for a generator control reference, wherein the blade control reference controls aerodynamic properties of a blade of the wind turbine generator and the generator control reference controls at least one of a power output, a torque, and a rotational speed control reference of the wind turbine generator, the controller comprising:
    a dynamic model that includes states representative of operation of the wind turbine generator and the values of the blade and generator control references, wherein the dynamic model provides future values of the states, and wherein the dynamic model formulates a coupled dependency of the blade control reference and the generator control reference based on future values of the states:
    a constraint defining a limit of a future operational parameter of the wind turbine generator;
    a cost function to determine costs of operating the wind turbine generator, the cost function based, at least in part, on the future values of the states, wherein the cost function further determines a numerical cost value relating to operating the wind turbine generator; and
    a solver for determining the value of the blade control reference and the value of the generator control reference based on the determined numerical cost value, wherein the values of the blade and generator control references are outputs of the controller.

2. The controller according to claim 1, wherein the cost function includes a term that relates to a power production of the wind turbine generator.

3. The controller according to claim 1, wherein the cost function includes a term that relates to fatigue load of the wind turbine generator.

4. The controller according to claim 1, wherein the cost function includes a term that relates to fatigue load of the wind turbine generator and a term that relates to a power production of the wind turbine generator.

5. The controller according to claim 1, wherein the future operational parameter of the wind turbine generator depends on the future values of the states.

6. The controller according to claim 1, wherein the numerical cost value of the cost function depends on a difference between the future operational parameter and a soft constraint defining a soft limit of the future operational parameter.

7. The controller according to claim 6, wherein the soft limit of the future operational parameter is a limit on rotor speed enabling the rotor speed to be higher than a nominal rotor speed for a period of time.

8. The controller according to claim 1, wherein the solver determines the blade control reference and the generator control reference for controlling both pitch and the torque of the wind turbine generator when the controller is in both a partial load state and a full load state.

9. The controller according to claim 1, wherein the solver is configured to determine the blade and generator references during operation of the wind turbine generator.

10. A wind turbine generator comprising:
    a controller configured to control a value for a blade control reference and a value for a generator control reference, wherein the blade control reference controls aerodynamic properties of a blade of the wind turbine generator and the generator control reference controls at least one of a power output, a torque, and a rotational speed control reference of the wind turbine generator, the controller comprising:
        a dynamic model that includes states representative of operation of the wind turbine generator and the values of the blade and generator control references, wherein the dynamic model provides future values of the states, and wherein the dynamic model formulates a coupled dependency of the blade control reference and the generator control reference based on future values of the states:
        a constraint defining a limit of a future operational parameter of the wind turbine generator;
        a cost function to determine costs of operating the wind turbine generator, the cost function based, at least in part, on the future values of the states, wherein the cost function further determines a numerical cost value relating to operating the wind turbine generator; and
        a solver for determining the value of the blade control reference and the value of the generator control reference based on the determined numerical cost value, wherein the values of the blade and generator control references are outputs of the controller.

11. A method for controlling a value for a blade control reference and a value for a generator control reference of a wind turbine generator, wherein the blade control reference controls aerodynamic properties of a blade of the wind turbine generator and the generator control reference controls at least one of a power output, a torque, and a rotational speed control reference of the wind turbine generator, the method comprising:
    providing a controller that includes:
        a dynamic model that includes states representative of operation of the wind turbine generator and the values of the blade and generator control references, wherein the dynamic model provides future values of the states, and wherein the dynamic model formulates a coupled dependency of the blade control reference and the generator control reference based on future values of the states,
        a constraint defining a limit of a future operational parameter of the wind turbine generator, and
        a cost function to determine costs of operating the wind turbine generator, the cost function based, at least in part, on the future values of the states, wherein the cost function further determines a numerical cost value relating to operating the wind turbine generator; and
    determining the value of the blade control reference and the value of the generator control reference based on the determined numerical cost value, wherein the values of the blade and generator control references are outputs of the controller.

12. The wind turbine generator of claim 10, wherein the solver determines the blade control reference and the generator control reference when the controller is in both a partial load state and a full load state.

13. The method of claim 11, wherein determining the blade control reference and the generator control reference is performed when the wind turbine generator is in both a partial load state and a full load state.

* * * * *